United States Patent
Postnikov

(10) Patent No.: US 12,380,107 B2
(45) Date of Patent: Aug. 5, 2025

(54) METHOD OF SEARCHING FOR DATA FOR MACHINE LEARNING TASKS

(71) Applicant: Roman Vladimirovich Postnikov, Moscow (RU)

(72) Inventor: Roman Vladimirovich Postnikov, Moscow (RU)

( * ) Notice: Subject to any disclaimer, the term of this patent is extended or adjusted under 35 U.S.C. 154(b) by 0 days.

(21) Appl. No.: 18/282,635

(22) PCT Filed: Mar. 14, 2022

(86) PCT No.: PCT/RU2022/050078
§ 371 (c)(1),
(2) Date: Sep. 18, 2023

(87) PCT Pub. No.: WO2022/203549
PCT Pub. Date: Sep. 29, 2022

(65) Prior Publication Data
US 2024/0168951 A1    May 23, 2024

(30) Foreign Application Priority Data
Mar. 22, 2021   (RU) .......................... RU2021107455

(51) Int. Cl.
*G06F 16/2455*   (2019.01)

(52) U.S. Cl.
CPC .................. *G06F 16/2455* (2019.01)

(58) Field of Classification Search
CPC ..................... G06F 16/2455; G06N 20/00
See application file for complete search history.

(56) References Cited

U.S. PATENT DOCUMENTS

| | | | |
|---|---|---|---|
| 10,275,418 B2 | 4/2019 | Aleskerov et al. | |
| 11,194,848 B2 | 12/2021 | Filonov et al. | |
| 2006/0224579 A1 | 10/2006 | Zheng | |
| 2018/0189292 A1 | 7/2018 | Grace, Jr. et al. | |
| 2020/0073953 A1 | 3/2020 | Kulkarni | |

FOREIGN PATENT DOCUMENTS

| | | | |
|---|---|---|---|
| CN | 113542228 B | * | 8/2022 |
| CN | 116011594 A | * | 4/2023 |
| CN | 116796860 A | * | 9/2023 |
| RU | 2543315 C2 | | 2/2015 |
| RU | 2720954 C1 | | 5/2020 |

OTHER PUBLICATIONS

International Search Report with Translation and Written Opinion for PCT application No. PCT/RU2022/050078, mailed Jul. 21, 2022.
International Application Status Report generated Sep. 12, 2023.

* cited by examiner

*Primary Examiner* — William Spieler

(57) ABSTRACT

A method for searching data for machine learning tasks is provided, comprising: generating a search request at a client data node, the search request comprising a client data set having objects and their labels; and sending the search request to an owner data node; and performing, by the client data node, the following operations: (a) characterizing the objects by a feature set comprising at least one feature from an owner data set, (b) determining a first prediction function of the feature set and the labels, (c) calculating a value of at least one loss function for the first prediction function; (d) determining a second prediction function of the features from the client data set and the labels; (e) calculating a value of at least one loss function for the second prediction function; and (f) generating a response to the received search request, the response comprising information on at least one data owner.

14 Claims, No Drawings

METHOD OF SEARCHING FOR DATA FOR MACHINE LEARNING TASKS

FIELD

The invention relates to a field of machine learning, particularly to methods for searching relevant data for machine learning tasks from a data set available in paid or free access and stored on data nodes of various owners.

BACKGROUND

As known in the art, one of the variants of machine learning is "supervised learning" during which a labeled end data set is specified that contains objects characterized by a set of features and corresponding to the label objects. It is assumed that a certain target dependence (functional or stochastic) exists between objects and labels and, accordingly, between the set of features that characterize the objects and the labels. In this case, the learning process essentially means determining a prediction function between the set of features and labels according to a certain algorithm of machine learning based on a specified labeled end data set, where the "features" shall be understood as variable functions, and the "label" shall be understood as a function value. Moreover, to make the determined prediction function practically applicable to complete certain tasks, for example, the tasks in classification or regression, it shall approximate the target dependence not only at a specified set of objects, but also at conventionally infinite multiplicity of objects characterized by the same set of features.

It is obvious that the degree of approximation of the obtained prediction function to the target one directly depends on the set of labeled data used for training. In this case, not only the number of "object-label" pairs (so called "examples", or "use cases") is important, but also important which set of features is used for characterization of the objects. Moreover, both correlation between the features in the set and correlation between each individual feature from the set and the label have essential impact on a quality of learning.

Thus, it is easy to notice that the task of searching and expanding the set of features is a critical aspect of machine learning process. Currently, there are several services known in the prior art field that help to solve this problem, such as Dawex and Google Dataset Search.

Dawex is a data exchange platform that allows various organizations to distribute, receive, exchange, share, and monetize data, as well as manage a data ecosystem.

Google Dataset Search works similarly to any standard Google search service and allows a user to enter a natural language search request describing a desired data set and to receive, as a response to the search request, a list of owners being presumably relevant to the search request based on a textual description of the data, as well as links to websites of the owners. Google Dataset Search is considered as the closest prior art (i.e. a prototype) for the present invention.

Thus, a client using one of these services can find a desired data set and download it so as to apply the downloaded data set to machine learning tasks. It is obvious that the found data sets can be applied in different ways. For example, a labeled data set originally owned by the client may be expanded by adding new features characterizing existing objects contained in the data set.

Disadvantages of both services mentioned above are conditioned by the following fact. If a desired data set is used for machine learning tasks after completing the search, during the search the client will not be able to evaluate a degree of relevance of the found data sets to the task used for conducting the search. The understanding of how much the found data set or another data set, namely these or other features from the found data set as used for characterizing the objects from the labeled data set of the client, influence a quality of a prediction function searched in the process of machine learning, will become possible for the client only after downloading such data set and appropriate application thereof. Additionally, it is to note that free downloading of data may not be available as the data may only be accessible through paid access. In such cases, the client cannot completely evaluate the relevance of the found data to their task before purchasing the data.

Thus, in terms of machine learning, the aforementioned analogs and their search engines for searching datasets are ineffective since they do not allow the relevance of search results to specific machine learning tasks to be evaluated. It is to note that this disadvantage is not conditioned only by a form of a search response, but also by a form used for generating the search request. The aforementioned analogs use a semantic search type, wherein the search request is formulated by the client in a natural language, thereby preventing the machine learning task having the searched dataset applied thereto from being effectively characterized.

Therefore, in view of the above, a main technical problem to be solved by the present invention is reduced relevance of search results to specific machine learning tasks.

SUMMARY

The above main technical problem is solved by developing a method for searching data for machine learning tasks, the method including: (i) generating a search request at a client data node, the generated search request comprising a client data set having objects and labels corresponding to said objects; (ii) sending, by the client data node, the generated search request to a data node of at least one owner; (iii) receiving the sent search request at the owner data node and (iv) performing, by the owner data node, the following operations in relation to the received search request: (iv-a) characterizing said objects by a feature set comprising at least one feature from an owner data set; (iv-b) determining a prediction function of the feature set and the labels; (iv-c) calculating a value of at least one loss function for said prediction function of the feature set and the labels; (iv-d) determining a prediction function of features from the client data set and the labels; (iv-e) calculating a value of at least one loss function for said prediction function of the features from the client data set and the labels; (iv-f) comparing the calculated values of said loss functions; (iv-g) generating a response to the received search request, the response comprising information on at least one owner having the calculated loss function value for said prediction function of the feature set and the labels that is less than the calculated loss function value for said prediction function of the features from the client data set and the labels; and (iv-h) sending the generated response back to the client data node.

One of technical effects provided by the present invention is increased degree of relevance of search results for machine learning tasks. A further technical effect provided by the present invention is providing an assessment of the specified degree of relevance for each of the search results. Another technical effect provided by the present invention is simplified and speeded search process as a whole.

Firstly, the method according to the present invention provides the possibility of defining such information when generating a search request that would accurately determine for which machine learning task it is necessary to find data sets. In essence, the search request represents a set of labeled data that is generated by a corresponding technical specialist on the client side, preparing data for machine learning. Such a set of labeled data is an integral part of the process of supervised machine learning, therefore, according to the claimed method, the formation of a search request does not require any additional actions on the client side. Secondly, using such information from the search request, the data owner data node can take actions to assess how relevant the data on it is to the search request. To do this, locally at the data owner data node, objects from the client data set are characterized by features from the data set of the owner and trained with a teacher, as indicated above, to find the prediction function of the set of features and labels. Further, in order to give a qualitative assessment of the determined prediction function, and therefore, the features from the data set of the owner, the loss function value for the determined prediction function is calculated. Therefore, the implementation of the above stages of the claimed method, in particular, how the search request is generated and in what form the response to it is provided, allows to increase the relevance of search results for machine learning tasks, while including the calculated value of the loss function for the prediction function of the set of features containing features from the data set of the owner and labels, the client is provided with the opportunity to assess the indicated degree of relevance. Thus, the claimed method in general allows to simplify and speed up the process of searching for data for machine learning tasks.

An important aspect of this is that the evaluation of the relevance of the found data sets is performed without the need to transfer the data owner data to the client. Although, after selecting the necessary data set for its use, it will be necessary to transmit from the data owner data node to the client node, the need for such transmission at the stage of search and selection is completely excluded.

It is clear that the implementation of this method in full, namely—with the presence of multiple data nodes of owners to which the search request is centrally distributed and processed, as well as the presence of various additional aspects of the claimed method, which will be described below, is preferably performed by using a search service and, accordingly, using at least one data node of the search service.

As for the algorithm used for machine learning on the data owner data node, there are several preferred embodiments of the present invention.

In one preferred embodiment of the present invention, the search request generation step comprises defining at least one machine learning algorithm; the generated search request is sent to the owner data node directly or via a data node of a search service, and the generated response is sent back to the client data node directly or via the search service data node; and said prediction function of the feature set and the labels is determined by performing a learning procedure based on a pre-determined machine learning algorithm.

In another preferred embodiment of the present invention, the generated search request is sent to the owner data node via a data node of a search service, and wherein the generated response is sent back to the client data node via the search service data node, and wherein the method further comprises: identifying, by the search service data node, a type of the label in the client data set and selecting, by the search service data node, at least one machine learning algorithm for the identified label type before determining the prediction function of the feature set and the labels, and using the selected machine learning algorithm for determining the prediction function of the feature set and the labels.

In all of the above embodiments of the present invention, performing the learning procedure includes selecting hyper parameters of the machine learning algorithm by using at least one enumeration algorithm.

It is evident that for practical implementation of the current method with a large number of owners, it is impractical to send a search request to all available data providers without first assessing their potential to have relevant data to the search request. Therefore, it is preferable to use an data node of the search service as an intermediate link between the client and the owner, and after receiving the search request, perform a preliminary selection of owners who potentially may contain relevant data to the search request from the general list of owners available to the search service.

Thus, in the preferred embodiment of the present invention, the generated search request is sent to the owner data node via at least one search service data node, and the generated response is sent back to the client data node via said least one search service data node, and wherein the method further includes: registering, by means of said at least one search service data node, metadata on the owner data set at the search service data node before generating the search request, registering metadata on the client data set at the at least one search service data node when generating the search request; and selecting an owner data node at the search service data node by matching the metadata on the client data set and the metadata on the owner data set before sending the search request to the owner data node.

In the context of this document, the term "metadata" should be understood as broadly as possible, namely as any possible information about a client dataset and/or a owner. Thus, the metadata can be considered as features that characterize objects (e.g. "Temperature", "Color", "Number of visitors", etc.), where the value of the features for specific objects is not meant, but rather the existence of a particular feature as a characteristic of objects. Moreover, it is to note that objects in datasets can also contain identifiers-some "unique" features that allow to distinguish these objects from other objects, i.e. to identify them.

Therefore, in the preferred embodiment of the present invention, registering the metadata on the owner data set and the metadata on the client data set at the search service data node includes determining identifiers of the objects in the owner data set and the client data set; and wherein the objects are characterized by determining matches between identifiers and their values in the owner data set and identifiers and their values in the client data set and by linking feature values from the owner data set, feature values corresponding to each of the matched identifier values, to objects from the client data set, the objects corresponding to the matched identifier values. An identifier can be, for example, "Passport number", "Bank account number", "Geographic coordinates", "Date/Time", etc. Although identifiers themselves cannot positively influence the learning process, that is, improve the prediction function between features and labels, due to their uniqueness, they allow to precisely match feature values from the data owner datasets with objects from the client datasets. This aspect is discussed in more detail in the implementation examples of the claimed method described below.

In addition, features containing information about the date and/or time, specifically the date and/or time the data was recorded in the owner dataset and/or client dataset, can also be considered metadata.

Therefore, in a preferred embodiment of the present invention, registering the metadata on the owner data set and/or the metadata on the client data set at the search service data node includes determining time intervals of availability of the data in the owner data set and/or the data in the client data set.

It is clear that there are various implementations of the claimed method in terms of interaction with the client. In a preferred embodiment of the present invention, the formation, and/or sending, and/or provision of a response to a search request is performed using a user interface and/or an application programming interface (API). Thus, on the client side, interaction can be implemented, for example, through a website using certain interface elements (similar to traditional search services) within an integrated development environment by connecting the appropriate libraries and calling the appropriate functions.

Regarding the content and format of the response to a search request, It is clear that there are many possible implementations of the claimed method. In a preferred embodiment of the present invention, the response to the search request comprises information on the owner, a link to a owner site and/or a link to an application programming interface for accessing at least one owner data set.

Also, multiple embodiments of the present invention exist from the viewpoint of where and by which features the objects from the client data set are characterized and, therefore, how a search request is generated and what is included in the response thereto.

Thus, in one of the preferable embodiments of the present invention, generating the search request at the client data node includes characterizing the objects by means of the at least one feature from the client data set; and wherein the objects are characterized by a feature set comprising at least one feature from an owner data set and the at least one feature from the client data set after receiving the search request at the owner data node. As mentioned above, the quality of training reflects not only the correlation between each individual feature from the dataset and the label, but also the correlation between the features in the dataset. Thus, in this implementation variant, during training on the data owner data node, a prediction function between the set of features and labels is determined, where the set of features contains not only features from the data owner dataset, but also features from the client dataset. Therefore, this preferred embodiment variant allows evaluating the relevance of the data owner found data to the search request, taking into account the correlation between the features from the data owner dataset and the features from the client dataset.

In another preferable embodiment of the present invention, the characterization of the objects by the at least one feature from the client data set, and the determination of the at least one prediction function of the features from the client data set and the labels, and the calculation of the value of the at least one loss function for the prediction function of the features from the client data set and the labels are all performed before generating the search request at the client data node, and wherein the search request generation step includes indicating the value of the calculated loss function for the prediction function of the features from the client data set and the labels. Thus, this implementation variant allows evaluating whether the features from the data owner dataset provide an opportunity to obtain a more accurate prediction function (i.e. a prediction function that is more closely approximated to the target dependence than the prediction function determined by using features from the client dataset), and to understand to what extent such a prediction function will be better. In addition, owners whose datasets, despite containing machine learning relevant data, cannot provide the client with the opportunity to find a more accurate prediction function than the one already available to the client will be automatically excluded from the search request response.

In yet another preferable embodiment of the present invention, when generating a search request, objects are characterized by at least one feature from the client data set. After receiving the search request, at least one prediction function of features from the client data set and labels is determined, and the value of at least one loss function is calculated for the prediction function of features from the client data set and labels. The values of the loss function for the prediction function of features from the client data set and labels and the prediction function of the set of features containing at least one feature from the owner data set and labels are compared. In response to the search request, information about at least one owner is included, whose loss function value for the prediction function of the set of features containing at least one feature from the owner data set and labels is less than the loss function value for the prediction function of features from the client data set and labels. Essentially, this implementation achieves the same result as the previous one, the only difference is which data node performs the machine learning to find the prediction function of the features from the client data set and labels, and then calculates the loss function value for this prediction function.

In general, it is clear that in multiple embodiments of the present invention which method steps need to be implemented on which data nodes. For example, the calculation of at least one loss function value can be performed by either the owner data node or the search service data node.

It is to further note that the claimed technical solution provides the possibility of using additional mechanisms to help the client to find the most relevant search result faster. Thus, in the preferred embodiment of the present invention, information used as the response to the search request is sorted by values of corresponding loss functions. It is clear that various known loss functions can be used as loss functions, such as quadratic, binary, and simple. In this case, information containing the values of several loss functions is preferably used as a response to the search request, and accordingly, the possibility of sorting by the values of each of the loss functions is provided.

As is known, certain functions called metrics are used to evaluate the quality of the prediction functions of features and labels as determined as a machine learning result. A variety of the following metrics are widely used in machine learning tasks, for example, in classification tasks: "accuracy" (the proportion of correct "answers"), "precision" (the proportion of objects correctly classified by the classifier into a certain class, relative to the total number of objects classified into the given class), "recall" (the proportion of objects correctly classified by the classifier into a certain class, relative to all objects that actually belong to this class), "F-measure" (the harmonic mean value of "precision" and "recall"), etc. There are also metrics that characterize the stability of the values of the loss function over a certain time interval, and metrics that characterize the predictive power of a certain feature. Obviously, using the values of various metrics calculated from the prediction functions of features from data sets of owners and labels, it is possible to evaluate the degree of relevance of the found data sets to the client search request. Thus, in the preferred embodiment of the present invention, the claimed method further comprises after the calculation of the value of the loss function for the prediction function of the feature set and the labels, calculating a value of at least one metric indicative of a stability of the loss function values during at least one time interval; and incorporating the calculated metric value into the information used as the response to the search request. In addition, in the preferred embodiment, the claimed method further comprises calculating a value of at least one metric indicative of a predicted power of the at least one feature from the owner data set; and incorporating the calculated metric value into the information used as the response to the search request.

DETAILED DESCRIPTION

It is clear that the implementation of the claimed method is preferably performed by a corresponding system comprising at least one client data node, at least one search service data node, and at least one data node of a data provider, wherein all of said nodes are interconnected via a computer network (in particular, a local network or Internet). The client data node and/or the search service data node contain program instructions stored on a machine-readable storage medium of the respective data node. When executed by at least one processor of the client data node and/or the search service data node, these program instructions ensure the formation of a search request with an indication of the client data set containing objects and corresponding labels, the sending of the search request to at least one owner data node, the provision of a response to the search request on the client data node, and the owner data node contains program instructions stored on a machine-readable storage medium of the owner data node. When executed by at least one processor of the owner data node, these program instructions ensure the specification of object characteristics through a feature set containing at least one feature from the owner data set, the determination of at least one dependency function of the feature set and the labels, and the calculation of at least one loss function value for the dependency function of the feature set and the labels. The response to the search request contains the calculated loss function value.

Preferably, the system is implemented to provide the possibility of implementing all of the specified preferred embodiment options of the claimed method.

In the context of this application, a data node should be understood as any stationary or mobile computing device, such as a server, personal computer, laptop, smartphone, tablet, etc., as well as a group of such devices combined into a single computing system. Access to such a system can be implemented both directly and through the use of a "thin" client, for example, through a web browser.

It is to further note that interaction between data nodes can be implemented both directly and through various types of network equipment, as well as through other data nodes.

The specified preferred embodiment options of the method according to the present invention are given as an example and do not limit the scope of claims in this application. The claimed method can be implemented in any other way, including characterized by the claimed set of essential features.

The claimed solution, implemented according to the most preferred embodiment option, is implemented as follows.

First of all, a system is organized, containing at least one client data node, at least one search service data node, and data nodes of owners, united by a computer network (local or internet).

Further, using data nodes of owners, metadata about data sets of owners is registered on the search service data node. At the same time, identifiers of objects in the data set of the/owner are determined.

Further, a search request is generated on the client data node, indicating the client data set, containing objects and corresponding object labels, where the objects are characterized by features from the client data set. At the same time, metadata about the client data set is also registered on at least one search service data node, and identifiers of objects in the client data set are determined.

After that, a search request is sent via a computational network through the data node of the search service. The data node of the search service then determines the type of label in the client dataset and selects a machine learning algorithm for the specific label type. The data node of the search service also selects owner data nodes by matching metadata about the client dataset with metadata about the data owner dataset (primarily choosing between owners, not between data nodes of one owner).

Further, the search request is directed to the selected owner data nodes. After receiving the search request, each owner data node finds at least one prediction function of features from the client dataset and labels, calculates the value of at least one loss function for the prediction function of features from the client dataset and labels, while determining the prediction function of features and labels through learning the previously selected algorithm, and in the learning process, selects hyperparameters of the machine learning algorithm using at least one search method. Further, objects are characterized by a set of features, containing at least one feature from the corresponding data owner dataset. At the same time, object characterization is performed by determining matches of identifiers and their values in the data owner dataset with identifiers and their values in the client dataset and binding the feature values from the data owner dataset corresponding to each of the matching identifier values to objects from the client dataset characterized by matching identifier values, respectively. Further, at least one prediction function is determined between the specified set of features and labels, the value of at least one loss function is calculated for the prediction function of the set of features and labels, while determining the prediction function of the set of features and labels through learning the previously selected algorithm, and in the learning process, selecting hyperparameters of the machine learning algorithm using at least one search method. Further, the owner data nodes compare the loss function values for the prediction function of features from the client dataset and labels and the loss function for the prediction function of the set of features containing at least one feature from the data owner dataset and labels. In addition, after determining the prediction function by the owner data nodes, the predictive power metrics of each feature in the data owner dataset are calculated.

Then, a response to the search request is provided on the client data node, including information only about those owners whose loss function value for the prediction function of the feature set containing at least one feature from their data sets and labels is less than the loss function value for the prediction function of the features from the client data set and labels. The information used as a response to the search request includes a description of each owner, a link to their website and/or a link to access their data set, their computed loss function value for the prediction function of the feature set containing features from their data set and labels, as well as the computed value of metrics characterizing the predictive power of each feature from their data set. Additionally, the information used as a response to the search request is sorted by the loss function values so that the owners with the smallest loss function value are listed first. During the implementation process, the formation, sending, and provision of the response to the search request are performed by using a user interface.

Below are the explanatory examples of the embodiments of the method claimed with reference to specific practical machine learning tasks.

Example No. 1—Searching for Data Sets for Predicting a Turnover of a Sales Outlet In this example, a client-retailer has a data set comprising objects (records describing the facts of sales of a specific goods), and labels corresponding to objects (number of goods items sold). Initially, the client also has some machine learning model (some prediction function determined between the set of features and labels) that predicts the goods turnover of a sales outlet. In this case, said prediction function was determined as a result of machine learning during which the objects were characterized by the set of features from the client data set that comprised the following features: price of goods (price variation history), sales outlet work schedule, availability of competitive goods on the sales outlets' shelves, date when the record was made, sales outlet address (including ZIP code), etc. Also, the value of the loss function for the prediction function of the features from the client data set and labels was calculated. As a loss function, root mean squared logarithmic error (RMSLE) was calculated.

The goal is to find datasets containing features that are highly correlated with the labels, thus allowing the client to find a new prediction function that provides a more accurate forecasting result.

To do this, a client forms a search request using a system that implements the method claimed by specifying their data set comprising objects that correspond to the label objects, characterizing the objects by features at the same time. Thus, a search request is essentially a set of labeled data that is generated by a relevant technician on the client side during preparation of data for machine learning.

In this example, the search request was sent and the response was provided through the data node of the search service. When generating the search request, the client data node registered metadata about the client dataset and identified object identifiers on the search service's data node. Then, the data nodes of the owners were selected on the search service's data node by comparing the metadata of the client dataset (in particular, identifiers) with the corresponding metadata of the owners' datasets, which had been previously registered. In the aforementioned client dataset, ZIP codes indicating geographic areas where retail stores are located and the date of the record were defined as identifiers. Then, the data nodes of the owners in whose datasets the same identifier (ZIP code) existed were selected. The search request was then sent through the search service's data node to the selected data nodes of the owners.

In this example, one of the selected owners was a weather data service, whose data node had an archive dataset containing features characterizing weather conditions (temperature, humidity, precipitation, etc.) linked to the same identifier (ZIP code), as well as indicating the corresponding date.

After receiving a search request, the data node characterized objects through a set of features that included features from both the owner and client data sets. Object characterization was done by determining matches between the ZIP codes and dates in the owner data set with those in the client data set, and linking feature values from the owner data set that corresponded to each of the matching identifiers to objects in the client data set that were characterized by the matching identifier values. In other words, the data set contained in the search request was supplemented with features from the owner data set. Thus, the resulting labeled data set included objects characterized by the following features: product price (price change history), schedule of store operations, presence of other competitive products on store shelves, date, store address (including ZIP code), temperature, humidity, precipitation, where each object characterized by specific feature values corresponded to a label indicating the number of units sold.

Further, owner data nodes (including the weather data service mentioned above) determined prediction functions between the obtained feature set containing features from both the owner and client data sets, and the labels, and computed the RMSLE loss function values for the determined prediction functions.

Then, the client data node is provided with a response to the search request, which included a description of each owner, a link to their website, and a link to access their data set, as well as the computed value of the RMSLE loss function for the determined prediction function of the feature set containing features from their data set and the client data set, and the labels.

This example can clearly demonstrate the disadvantages of semantic search used in the technical solution taken as a prototype, and accordingly, the advantages of the method for searching datasets claimed in this application. It is to note that the client may not even suspect what kind of data may ultimately be relevant to his task and, accordingly, may not know what information to specify in the semantic search request. For example, weather data, which at first glance have nothing to do with predicting sales, can actually significantly increase the accuracy of the prediction function if the products themselves are related to weather conditions in which they are usually used by customers. Such products may include raincoats, ice cream, etc. Therefore, for such products, the dataset found as a result of using the claimed method with features characterizing weather conditions will have a high degree of correlation with the labels from the client dataset and, thus, allow the determination of a prediction function that more accurately predicts sales, which will be reflected in the value of the RMSLE loss function calculated for this prediction function.

Thus, having received a response to the search request and comparing the value of the RMSLE loss function for the prediction function that the client initially had (meaning the prediction function of the features from the client dataset and the labels) and the RMSLE loss function for the prediction function of the set of features containing features from the owner dataset and the client dataset, and the labels, the client can make sure that the dataset found by the owner of the data, which is relevant to the client machine learning task. Then the client can purchase the dataset found from the owner if access to it is restricted or immediately download it if it is available in free access.

Example No. 2—Finding Datasets for Predicting the Number of Visitors to a Shopping Center In this example, the client had a certain labeled dataset before them for predicting the number of visitors, obtained from marketing research. The client dataset was labeled with records of the number of visitors. Before generating the search request, the objects were characterized by a set of features, including data on the number of cars in shopping center parking lots obtained by recognizing satellite images updated daily, data on the number of products sold, as well as the date and coordinates of the parking lots taken from the image descriptions.

It is to note that, as in this example, it is not always possible to clearly understand what exactly is the "object" in the labeled dataset. In any case, an "object" should be understood as something described through an available set of feature values corresponding to a specific label. In other words, if you imagine the labeled dataset as a table where features are listed in columns, and labels are listed in the last column, then each row containing a set of specific feature values (without the last column) will essentially be an "object", and the last column will contain the label value corresponding to a specific object.

Obviously, the client dataset is not sufficient for determining a prediction function that would allow predicting the number of visitors with a high degree of accuracy, partly due to the lack of information on the number of cars in parking lots for each day. Thus, it was necessary to find datasets containing features that would be highly correlated with labels and, thus, allow the determination of a new prediction function that would provide a more accurate prediction result.

The implementation of the claimed method in this example, particularly the stages of formation, sending, and providing a response to a search request, as well as additional stages, are largely analogous to the previous example described above and therefore are described less in detail in the considered example.

Geographic coordinates and date served as identifiers. As a result of the search, the owner was found, who had a dataset containing information on the number of devices registered in Wi-Fi networks on a daily basis with a reference to geographic coordinates. After receiving the search request, the data node characterized the objects by means of a set of features containing features from the data set of the owner and features from the client data set. Thus, the obtained labeled dataset characterized the objects with the following features: the number of cars in shopping center parking lots, data on the number of sold goods, date, parking coordinates and the number of devices registered in Wi-Fi networks. Further, the data node of this owner determined the prediction function of the obtained set of features, containing features from the data set of the owner and features from the client data set, and labels, and calculated the loss function value for the determined prediction function.

Upon receiving a response to the search request, the client could compare the loss function value for the prediction function determined by using the dataset containing information about the number of devices registered in Wi-Fi networks with the loss function values from other owners, ensure the high relevance of such a dataset to the machine learning task, and decide on the feasibility of its use.

Thus, the present invention represents a method of searching for data for machine learning tasks, implementation of the main stages of which ensures the achievement of the technical result, consisting in increasing the relevance of search results for machine learning tasks, providing an assessment of the indicated degree of relevance for each of the results and, as a consequence, simplifying and accelerating the search process as a whole.

It is clear that the claimed method of searching for data for machine learning tasks, as defined in the accompanying formula of the invention, is not necessarily limited to specific features and implementation options described above. On the contrary, specific features and implementation options described above are disclosed as examples implementing the formula, and other equivalent features may be covered by the formula of the present invention.

The invention claimed is:

1. A method for searching data for machine learning tasks, the method comprising:
   generating a search request at a client data node, the generated search request comprising a client data set having objects and labels corresponding to said objects;
   sending, by the client data node, the generated search request to a data node of at least one data owner;
   receiving the sent search request at the owner data node and performing, by the owner data node, the following operations in relation to the received search request:
   characterizing said objects by a feature set comprising at least one feature from an owner data set;
   determining a function of the feature set and the labels;
   calculating a value of at least one loss function for said function of the feature set and the labels;
   determining a function of features from the client data set and the labels;
   calculating a value of at least one loss function for said function of the features from the client data set and the labels;
   comparing the calculated values of said loss functions;
   generating a response to the received search request, the response comprising information on at least one data owner having the calculated loss function value for said function of the feature set and the labels that is less than the calculated loss function value for said function of the features from the client data set and the labels; and
   sending the generated response back to the client data node.

2. The method according to claim 1, wherein
   the search request generation step comprises defining at least one machine learning algorithm;
   the generated search request is sent to the owner data node directly or via a data node of a search service, and the generated response is sent back to the client data node directly or via the search service data node; and
   said function of the feature set and the labels is determined by performing a learning procedure based on a pre-determined machine learning algorithm.

3. The method according to claim 1, wherein
   the generated search request is sent to the owner data node via a data node of a search service, and wherein the generated response is sent back to the client data node via the search service data node, and wherein the method further comprises:
   identifying, by the search service data node, a type of the label in the client data set and selecting, by the search service data node, at least one machine learning algorithm for the identified label type before determining the function of the feature set and the labels, and using the selected machine learning algorithm for determining the function of the feature set and the labels.

4. The method according to claim 2, wherein performing the learning procedure includes selecting hyper parameters of the machine learning algorithm by using at least one enumeration algorithm.

5. The method according to claim 1, wherein
the generated search request is sent to the owner data node via at least one search service data node, and the generated response is sent back to the client data node via said least one search service data node, and wherein the method further includes:
registering, by means of said at least one search service data node, metadata on the owner data set at the search service data node before generating the search request;
registering metadata on the client data set at the at least one search service data node when generating the search request; and
selecting an owner data node at the search service data node by matching the metadata on the client data set and the metadata on the owner data set before sending the search request to the owner data node.

6. The method according to claim 5, wherein
registering the metadata on the owner data set and the metadata on the client data set at the search service data node includes determining identifiers of the objects in the owner data set and the client data set; and wherein
the objects are characterized by determining matches between identifiers and their values in the owner data set and identifiers and their values in the client data set and by linking feature values from the owner data set, feature values corresponding to each of the matched identifier values, to objects from the client data set, the objects corresponding to the matched identifier values.

7. The method according to claim 5, wherein registering the metadata on the owner data set and/or the metadata on the client data set at the search service data node includes determining time intervals of availability of the data in the owner data set and/or the data in the client data set.

8. The method according to claim 1, wherein
the response to the search request comprises information on the data owner, a link to a data owner site and/or a link to an application programming interface for accessing at least one owner data set.

9. The method according to claim 1, wherein
generating the search request at the client data node includes characterizing the objects by means of the at least one feature from the client data set; and wherein
the objects are characterized by a feature set comprising at least one feature from an owner data set and the at least one feature from the client data set after receiving the search request at the owner data node.

10. The method according to claim 1, wherein
the characterization of the objects by the at least one feature from the client data set, and the determination of the at least one function of the features from the client data set and the labels, and the calculation of the value of the at least one loss function for the function of the features from the client data set and the labels are all performed before generating the search request at the client data node, and
wherein the search request generation step includes indicating the value of the calculated loss function for the function of the features from the client data set and the labels.

11. The method according to claim 1, wherein information used as the response to the search request is sorted by values of corresponding loss functions.

12. The method according to claim 1, wherein the generation and/or the sending of the response to the search request are performed by using a user interface and/or an application programming interface.

13. The method according to claim 1, further comprising
after the calculation of the value of the loss function for the function of the feature set and the labels, calculating a value of at least one metric indicative of a stability of the loss function values during at least one time interval; and
incorporating the calculated metric value into the information used as the response to the search request.

14. The method according to claim 1, further comprising
calculating a value of at least one metric indicative of a predicted power of the at least one feature from the owner data set; and
incorporating the calculated metric value into the information used as the response to the search request.

* * * * *